United States Patent [19]

Fong et al.

[11] Patent Number: 5,336,729

[45] Date of Patent: Aug. 9, 1994

[54] ACRYLAMIDE CO-POLYMERS WITH (2-ACRYLAMIDO-2-HYDROXYETHYL) LOWER TRIALKYL AMMONIUM SALTS

[75] Inventors: Dodd W. Fong, Naperville; Frederick J. Swiecinski, Algonquin, both of Ill.

[73] Assignee: Nalco Chemical Company, Naperville, Ill.

[21] Appl. No.: 109,183

[22] Filed: Aug. 18, 1993

[51] Int. Cl.$^5$ .................. C08F 220/60; C08F 8/30; C08F 8/28
[52] U.S. Cl. .................. 525/329.4; 525/351; 525/359.3; 525/378; 526/287; 526/292.95
[58] Field of Search ............ 525/329.4, 378, 359.3, 525/351; 526/287, 292.95

[56] References Cited

U.S. PATENT DOCUMENTS

| | | | |
|---|---|---|---|
| 4,390,659 | 6/1983 | Stanley, Jr. et al. | 524/555 |
| 4,414,370 | 11/1983 | Hamielec et al. | 526/88 |
| 4,529,787 | 7/1985 | Schmidt et al. | 526/317 |
| 4,546,160 | 10/1985 | Brand et al. | 526/320 |
| 4,886,872 | 12/1989 | Fong et al. | 525/329.4 |
| 5,010,166 | 4/1991 | Scholsky et al. | 528/323 |
| 5,116,922 | 5/1992 | Sundararaman et al. | 526/304 |
| 5,120,797 | 6/1992 | Fong et al. | 525/329.4 |

FOREIGN PATENT DOCUMENTS 1214598  11/1986  Canada.

Primary Examiner—Mark Nagumo
Attorney, Agent, or Firm—James J. Drake; Robert A. Miller; Joseph B. Barrett

[57] ABSTRACT

An acrylamide co-polymer which contains from between 1-60 mole percent of (2-acrylamido-2-hydroxy ethyl) trialkyl ammonium salt groups. These co-polymers are made by reacting (formylmethyl) trialykl ammonium salts at a pH of at least 9 and a temperature of between 15-80 degrees centigrade.

8 Claims, No Drawings

ACRYLAMIDE CO-POLYMERS WITH (2-ACRYLAMIDO-2-HYDROXYETHYL) LOWER TRIALKYL AMMONIUM SALTS

BACKGROUND OF THE INVENTION

1. Field of the Invention

The invention relates to cationic acrylamide co-polymers, in particular, acrylamide co-polymers functionalized by formocholine iodide (FCI) and their method of manufacturer.

2. Description of the Prior Art

Cationic acrylamide polymers are used for a variety of industrial applications. These water soluble co-polymers find usefulness as flocculants, coagulants and as dispersants. There are a number of cationic acrylamide polymers which are prepared by a variety of synthetic techniques. The present invention provides a series of novel cationic acrylamide polymers which are readily prepared from simple starting materials using relatively simple reaction conditions.

The basis of the synthetic technique to prepare the novel cationic acrylamide polymers of the invention stems from the known reaction of aldehyde containing compounds with primary amides, which yields secondary amide products. For example, carboxylic acid functionality may be grafted onto a polyacrylamide backbone by reacting the polyacrylamide with glyoxylic acid.

SUMMARY OF THE INVENTION

An acrylamide co-polymer which contains from between 1–60 mole percent of a (2-acrylamido-2-hydroxy ethyl) lower trialkyl ammonium salt. The invention also relates to the method of producing these co-polymers which comprises reacting an aqueous solution of polyacrylamide with a (formylmethyl) lower trialkyl ammonium salt at a pH of at least 9 and at a temperature between 15–80 degrees C. for a period of time sufficient to produce the co-polymer.

In a preferred embodiment of the invention, the alkyl groups are methyl groups. The anion may be chloride, bromide, iodide or methyl sulfate.

DESCRIPTION OF THE PREFERRED EMBODIMENT

The Starting Acrylamide Polymers

Polyacrylamides having molecular weights as little as 1,000 up to as much as several million are readily modified using the techniques more specifically described hereafter. Typically, the acrylamide polymers modified in accordance with the invention would have molecular weights preferably in the range of about 5,000 to about 20,000,000. In the examples hereafter set forth the acrylamide polymers that have been modified have molecular weights of 10,000 and over 1,000,000. The molecular weights described above are weight average molecular weights.

The Cationic Modifying Agent

The cationic modification agents used to produce cationic co-polymers of the invention are the (formylmethyl) trialkyl ammonium salts. In a preferred embodiment of the invention, alkyl groups are methyl.

MOLE RATIO OF THE (FORMYLMETHYL) TRIALKYL AMMONIUM SALT COMPOUND TO THE STARTING ACRYLAMIDE POLYMER

This cationic modifying agent is capable of reacting with the polyacrylamides to produce substituted acrylamide co-polymers which contain between 1–60 mole percent of (2-acrylamido-2-hydroxy ethyl) trialkyl ammonium salt polymers. In most instances the molar percent of the cationic acrylamide substituent will range between about 3 to 50 mole percent. The amount of cationic charge imparted to the acrylamide may be varied over a wide range employing a variety of starting acrylamide polymers having various molecular weights. This allows the production of cationic polymers that can be tailored to a specific industrial application, such as dispersion, flocculation and the like.

Preparation of the Modified Acrylamide Polymers of the Invention

To simplify understanding of the preparative techniques described hereafter the following glossary is presented:

| Glossary | |
| --- | --- |
| DMDMEA | 2,2-Dimethoxy-N,N-dimethylethylamine |
| DMETMAI | 2,2-Dimethoxyethyl trimethyl ammonium iodide |
| FCI | Formocholine iodide or (formylmethyl) trimethyl ammonium iodide |
| NMR | Nuclear mgnetic resonance |
| polyacrylamido quat | Acrylamide/2-acrylamido-2-hydroxyethyl trimethyl ammonium iodide copolymer |
| ppm | Parts per million |
| PVSK | Poly(vinylsulfuric acid) potassium salt |

EXAMPLES

Synthesis of the (Formylmethyl) Dimethyl $C_1$–$C_4$ Alkyl Ammonium Salt Compound The (formylmethyl) dimethyl $C_1$–$C_4$ alkyl ammonium salt compound is synthesized by reacting a primary halide of up to four carbons in length with 2,2-dimethoxy-N,N-dimethyl ethylamine in methanol to yield a quaternary ammonium acetal. The acetal is then hydrolyzed to an aldehyde by treatment with acid. The scheme is demonstrated by the synthesis of FCI, but the substitution of methyl iodide with other short chain alkyl halides will produce other cationic modifying agents. The FCI is a stable compound, although in an aqueous environment it undergoes a reversible reaction with water to yield 2,2-dihydroxyethyl trimethyl ammonium iodide, which will be referred to as the hydrated form of FCI. FCI and the hydrated form of FCI are considered to be the same compound. Degradation of FCI occurs at a pH of 13 or greater in an aqueous environment and at lower pH when dissolved in an aprotic solvent.

Synthesis of DMETMAI

Into a reactor fitted with standard equipment was charged 20.0 g (0.15 moles) of DMDMEA and 40 ml of methanol. The mixture was cooled and 29.0 g (0.20 moles) of methyl iodide was slowly added. When the addition was complete, the mixture was refluxed for several hours. Upon cooling in a dry ice/acetone bath, an amber colored solid precipitated. The solid was isolated by filtration and dried at room temperature. DMETMAI was characterized by proton and carbon NMR. Proton NMR signals were detected at 3.45 (singlet), 3.67 (singlet), 3.73 (doublet), and 5.10 (triplet) ppm. Carbon NMR signals were detected at 54.7, 55.2, 65.4 and 98.9 ppm.

Synthesis of FCI

Into a reactor fitted with standard equipment was charged 35.94 g (0.27 moles) of DMETMAI and 50 ml of deionized water. The pH of the mixture was adjusted to 1.0 by the addition of 0.84 g of 10M HCl. The mixture was stirred and heated at about 99° C. for 18 hours. A Dean-Stark trap was added to the reactor assembly and the mixture was heated to 110° C. to remove solvent. FCI was used as an aqueous solution. FCI was characterized by carbon NMR. Carbon NMR signals were detected at 55.0, 69.0 and 85.4 ppm.

Synthesis of Low Molecular Weight Polyacrylamido Quat

Into a vial was added 21.04 g of a 35% aqueous solution of polyacrylamide (10,000 M.W.), 13.76 g of a 40% aqueous solution of FCI and 0.05 g of deionized water. The mixture was stirred and adjusted to a pH of 9.0 with 0.55 g of a 50% aqueous solution of NaOH. The mixture was allowed to react without heating. The polyacrylamido quat was characterized by carbon NMR. In addition to signals typically detected for polyacrylamide, carbon NMR signals at 54.8, 67.8, 69.6 and 176.3 ppm were detected.

Synthesis of High Molecular Weight Polyacrylamido Quat

Into a reactor fitted with standard equipment was charged 25.5 g of a 30.5% polyacrylamide latex. In a beaker, 13.3 g of a 61.3% aqueous solution of FCI was stirred and adjusted to a pH of about 9 with a 50% aqueous solution of NaOH. The basic FCI solution was added to the reactor containing the polyacrylamide latex. The mixture was stirred and an additional 50% aqueous NaOH was added to obtain a reaction mixture pH of 9.0. After sixteen hours of stirring, the reaction mixture was added to methanol acidified with HCl. The functionalized polymer precipitated upon addition of the methanol and additional aqueous HCl was added to obtain a pH of 4.0. The polyacrylamido quat was isolated by filtration and characterized by carbon NMR. Carbon NMR spectra similar to the carbon spectra from the low molecular weight polyacrylamido quat were obtained.

THE POLYACRYLAMIDO QUAT

The reaction of FCI and polyacrylamide that yields the polyacrylamido quat is a relatively slow reversible reaction. Carbon NMR analysis indicates that at 25° C. and a pH of 9.0 the reaction will produce an equilibrium condition in about sixteen hours. At this time, both functionalized polyacrylamide and unreacted FCI will be present. The extent and rate of reaction will be influenced by pH, temperature and concentration.

Effect of Concentration on the Acrylamide/FCI Reaction

The concentration stability issue was approached by varying the water content of three polyacrylamide and FCI solutions. A mixture of a 30% aqueous solution of polyacrylamide and FCI was prepared. The polyacrylamide and FCI were in a 20:1 mole ratio of polyacrylamide to FCI. The pH of the mixture was adjusted to 9.0 with NaOH. Water was then added to the mixture to bring the non-volatile content of 30%. Two aliquots of this sample were further diluted to produce mixtures having non-volatile contents of about 20% and 10%. The samples were allowed to stand for several days before analysis by carbon NMR. The results are listed in Table IV.

TABLE IV

Percent Reacted FCI as a Function of Concentration at a Polyacrylamide/FCI Mole Ratio of 20:1, pH 9 and Temperature of 22° C.

| Concentration (Wt. %) | % Reacted FCI | % Polyacrylamido Quat |
| --- | --- | --- |
| 30 | 75 | 4.0 |
| 20 | 64 | 3.5 |
| 10 | 46 | 3.5 |

Analysis of the data in Table IV indicates that less polyacrylamido quat forms at lower concentrations, hence the desirability of using concentrated polyacrylamide solutions for the reactions. To demonstrate the reversibility of the polyacrylamide/FCI reaction, three samples were prepared in a manner similar to that described above but with two major differences. First, the polyacrylamide to FCI mole ration was about 4:1. Secondly, the initial solution was allowed to stand for several days before the dilutions were made. This permitted the maximum amount of polyacrylamido quat to form prior to analysis.

The analysis of these samples is listed in Table V. The extent of FCI reaction for these samples is proportional to the degree to which the system is in equilibrium, since the diluted samples would have an extent of reaction similar to that of the most concentrated sample prior to dilution. Comparison of the extent of reaction data of Tables IV and V indicates that the percentage of FCI that reacts is independent of the polyacrylamide to FCI mole ratio.

TABLE V

Percent Reacted FCI as a Function of Concentration at a Polyacrylamide/FCI Mole Ratio of 4:1, pH 9 and Temperature of 22° C.

| Concentration (Wt. %) | % Reacted FCI | % Polyacrylamido Quat |
| --- | --- | --- |
| 30 | 75 | 16.0 |
| 20 | 64 | 13.5 |
| 10 | 51 | 11.0 |

Effects of Temperature on the Polyacrylamide/FCI Reaction

A sample composed of FCI and polyacrylamide in a 1:4 mole ratio of FCI to polyacrylamide was prepared at a pH of 9.0. The sample had a non-volatile content of 30%. The sample was split in three portions. One portion was stored at room temperature, another was stored at 40° C. and the third at 60° C. After approximately 100 hours in storage, the samples were analyzed by carbon NMR at the temperatures that each sample was stored to obtain accurate product distributions. The NMR results are listed in Table VI. The data indicates that elevated temperatures reduce the amount of polyacrylamido quat formed in the equilibrium reaction.

TABLE VI

Percent Reacted FCI as a Function of Temperature at a Polyacrylamide/FCI Mole Ratio of 4:1, pH 9 and Concentration of 30% (Wt.)

| Temperature (°C.) | % Reacted FCI |
|---|---|
| 22 | 75 |
| 40 | 72 |
| 60 | 69 |

Effect of pH on the Polyacrylamide/FCI Reaction

The effect of pH on the polyacrylamide/FCI reaction was studied in three samples at pHs of 9.0, 6.0 and 3.0. The samples were composed of FCI and polyacrylamide in approximately a 1:4 mole ratio of FCI to polyacrylamide and had a non-volatile residue of about 30%. After mixing, the samples were allowed to stand for several days and were then analyzed using carbon NMR. The results are listed in Table VII.

TABLE VII

Percent Reacted FCI as a Function of pH at a Polyacrylamide/FCI Mole Ratio of 4:1, Concentration of 30% (Wt.) and Temperature of 22° C.

| pH | % Reacted FCI |
|---|---|
| 9 | 75 |
| 6 | <5 |
| 3 | <5 |

Virtually no reaction of the FCI with polyacrylamide was observed at pH 3 or 6. These results indicate the lower pH of the sample significantly slows the rate of the polyacrylamide/FCI reaction. As a result, it is possible to prepare a polyacrylamido quat using the disclosed method at a high pH and then stop the reaction indefinitely by lowering pH. This allows for ease of storage of the product. Once the stopped reaction mixture has been removed from storage, the polyacrylamide quat may be directly applied to a given process stream.

Stabilization of the Polyacrylamido Quat

It is clear from the above data that the polyacrylamide/FCI reaction is in equilibrium and conditions of high temperature and low concentration will result in polyacrylamido quat decomposition. The effect pH, on the other hand, can be used to stabilize the polyacrylamido quat.

A 30% solution of polyacrylamide and FCI in a 4:1 mole ratio of polyacrylamide to FCI prepared at pH 9.0 and shown to contain a significant amount of polyacrylamido quat, was treated with HCl to lower the sample pH to about 4. The sample was than monitored by carbon NMR for a 16 hour period. No detectable change in the concentration of the polyacrylamido quat occurred, suggesting that the lowering of the pH dramatically effects the rate, not the equilibrium, of the reaction.

To further test the stability of the polyacrylamido quat the low pH sample described above was diluted from 30% to about 15% with water. The diluted sample was then monitored by carbon NMR for a period of about 16 hours with no decomposition of the polyacrylamide quat observed. When a sample of polyacrylamido quat at pH 9 was diluted, decomposition of the polyacrylamido quat was observed.

To provide a more rigorous test of the sample's concentration stability, the above described sample was diluted to a non-volatile content of 2% with water. The sample was analyzed by carbon NMR several days, and then several weeks, after dilution. The data indicates that 75% of the FCI is present as the polyacrylamido quat. By reducing the pH of the polyacrylamido quat, the rate of the equilibrium reaction is been slowed to the extent that the product can be considered stable.

The above sample was then diluted and titrated with 0.001N PVSK to determine if the charge on the pH stabilized cationic polymer was detectable by wet chemical methodology. The 14 mole percent charge detected by colloid titration is in very good agreement with the 16 mole percent charge estimated from the NMR spectrum of the sample.

Results of this work indicate that polyacrylamido quat is readily prepared from the room temperature reaction of polyacrylamide and FCI at pH 9. This is an equilibrium reaction which will reverse, if the product is diluted at high pH. The rate at which a new equilibrium is established is rather slow, suggesting that high pH use of the polyacrylamido quat may be possible, if the time frame for dilution and application does not allow significant change of the reaction equilibrium. However, at low pH the polyacrylamido quat has been shown to be concentration stable as a result of slowing of the forward and reverse reaction kinetics.

The polymer is expected to lose its cationic charge gradually once it is discharged into the environment. The resulting uncharged polyacrylamide is much less toxic to aquatic life.

We claim:

1. An acrylamide copolymer comprising 1–60 mole percent (2-acrylamido-2-hydroxy alkyl) lower trialkyl ammonium salt groups.

2. The acrylamide copolymer of claim 1 wherein the lower trialkyl groups are methyls.

3. The acrylamide copolymer of claim 1 having a molecular weight in the range of 1,000 to 20,000,000.

4. The acrylamide copolymer of claim 3 having a molecular weight in the range of 5,000–10,000,000.

5. The acrylamide copolymer of claim 3 having a molecular weight in the range of 100,000–5,000,000.

6. The acrylamide copolymer of claim 1 where the anion of the salt group is selected from the group consisting of chlorine, bromine and methyl sulfate.

7. A method of producing an acrylamide copolymer comprising 1–60 mole percent (2-acrylamido-2-hydroxy ethyl) trialkyl ammonium salt groups which comprises reacting an aqueous solution of polyacrylamide with a specified amount of a (formylmethyl) trialkyl ammonium salt at a pH of at least 9 and at a temperature between 15°–80° C. for a period of time sufficient to produce the acrylamide copolymer.

8. The method of claim 7 wherein the trialkyl groups are methyls.

* * * * *